UNITED STATES PATENT OFFICE.

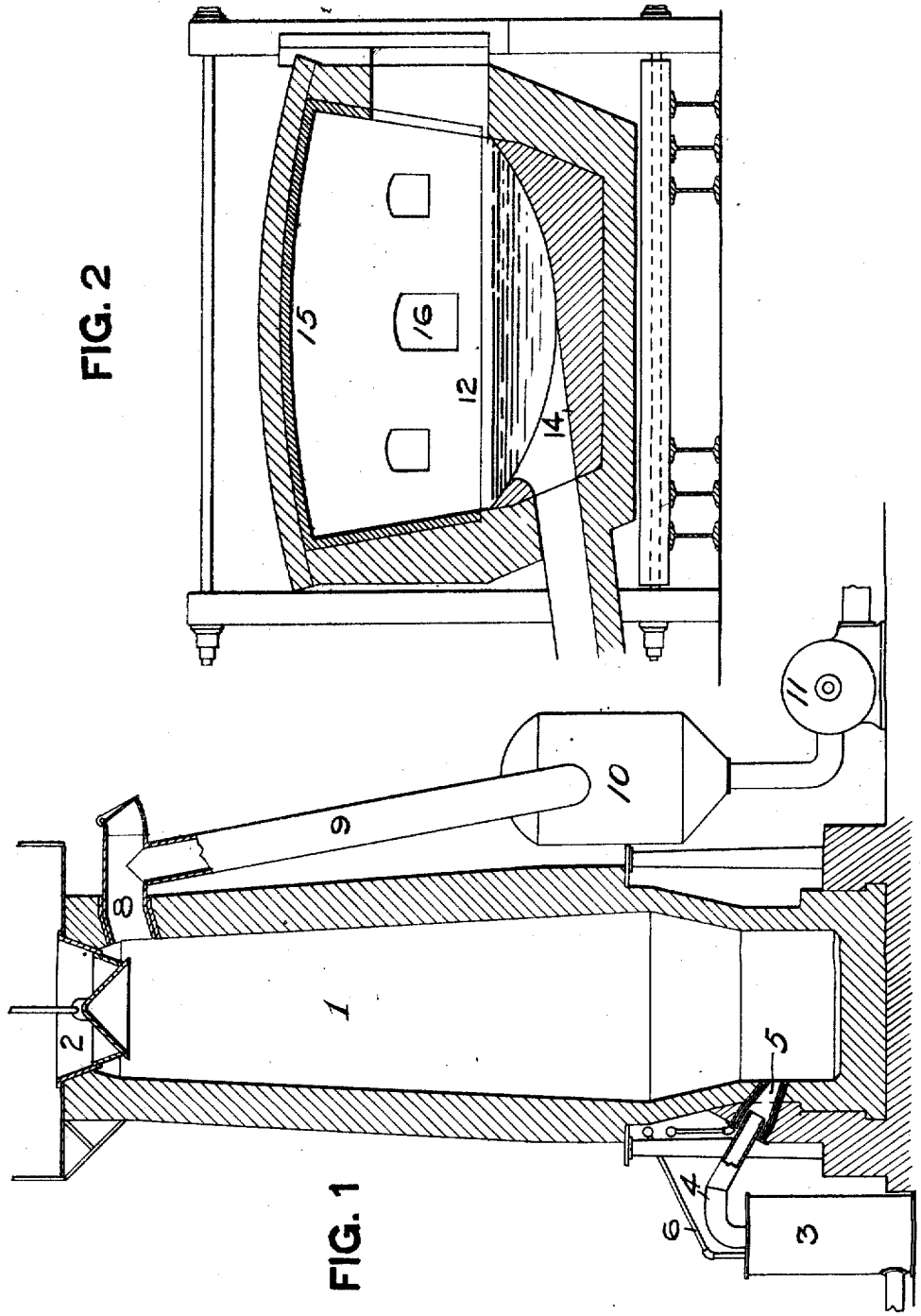

GEORGE LUTHER FOGLER, OF PITTSBURG, PENNSYLVANIA, ASSIGNOR TO FOGLER HEAT AND REDUCTION COMPANY, OF TACOMA, WASHINGTON, A CORPORATION OF WASHINGTON.

PROCESS OF REDUCING ORES.

No. 908,231.  Specification of Letters Patent.  Patented Dec. 29, 1908.

Application filed December 7, 1907. Serial No. 405,610.

*To all whom it may concern:*

Be it known that I, GEORGE L. FOGLER, a resident of Pittsburg, in the county of Allegheny and State of Pennsylvania, have invented a new and useful Improvement in Processes of Reducing Ores; and I do hereby declare the following to be a full, clear, and exact description thereof.

This invention relates to a process of reducing iron ore.

The object of the invention is to reduce ore of any character, even low grade ore or containing a large percentage of impurities, quickly and economically and so as to leave the iron practically pure or with only a small percentage of impurities.

The process consists, essentially, in first reducing all or the bulk of the iron ore to a silicate of iron, and then separating the iron from the silica by treating the silicate with suitable fluxes which fuse the silica, forming a vitreous slag, and permit the iron to drop down or separate therefrom.

In the accompanying drawings Figure 1 is a view partly in elevation and partly in section showing a stack furnace suitable for carrying out my process in its entirety, but preferably employed merely to reduce the ore to a silicate; and Fig. 2 is a vertical sectional view through a furnace suitable for reducing the silicate.

In carrying out my invention I may make use of any suitable smelting furnace, such for instance as the furnace 1 shown in Fig. 1, which is of the general blast furnace type, except that it is not operated under a blast. The ore together with the necessary fluxes, including lime or limestone, and also a certain amount of coke to keep the burden of the furnace open or porous, is fed into the furnace through the feeding hopper 2 in the usual way. The fuel or heating agent is a gas which may be generated in any suitable way and which is first superheated in a heater 3 and thence conducted by pipe 4 to the twyers or burner 5 projecting into the furnace chamber. A pipe 6 supplies the gas for operating the heater 3. The twyers 5 are open to the atmosphere at their outer ends around the gas pipe 4 so that the siphoning action of the gas draws in a supply of air, which, however, is insufficient to effect complete combustion of the gas and is so regulated as to produce the greatest increase in the temperature without entirely consuming the gas or impairing the value of the latter in reducing the ore. The gases under the conditions of increased pressure due to the superheating thereof and an insufficient air supply for complete combustion, pass into and through the reduction zone in the furnace and expand and flow rapidly upwardly, this being due to the greater porosity of the upper portion of the charge and because of a partial vacuum which is maintained at the upper or exhaust end of the furnace through pipe 8 connected to down-comer 9 leading to the collector 10. in which a suction or vacuum is maintained by fan or blower 11.

On account of maintaining a suction in the furnace the gases are caused to rapidly travel through the same and the $CO_2$ and $H_2O$ which are produced in the combustion zone are quickly removed from the reduction zone. This overcomes one difficulty in the ordinary operation of blast furnaces due to the fact that the action of the fluxes and of the reducing agents is limited, due to the presence of $CO_2$ and $H_2O$ which are formed in the combustion zone and which cannot escape or only escape slowly, due to the high pressure existing in the furnace on account of the blast, and at the temperature existing in the furnace the iron is oxidized by the $CO_2$ and $H_2O$. By causing the products of combustion to pass quickly away from the reduction zone, by means of the suction, this difficulty is overcome, thus giving the fluxes a good opportunity to act upon the ore.

The fusing action of the fuel and heat in this furnace first reduces the ore to a silicate, or at least largely to a silicate with possibly small amounts of oxid of iron in connection therewith. The amount of silicate that is formed depends upon the character of ore. Low grade ores which carry considerable silica have practically all the iron reduced to a silicate. As all ores have a considerable quantity of silica, a considerable proportion of silicate of iron is formed, the remainder of the iron generally being in practically a pure state held in suspension in the silicate. The reduction may be entirely completed in the one furnace, by operating according to the discontinuous method, that is, stopping the supply of ore and fluxes for a time while completing the reduction. But I prefer to carry on a continuous process in the stack 1 and consequently reduce the ore therein merely to the silicate as described, the separation of the iron from the silicate being effected in the second furnace, such as shown at 12, to which the product from the furnace 1 is tapped from time to time, or it may be conveyed thereto in any other way, and even allowed to cool and set before being put into the second furnace. The entire product of the stack 1 is conveyed to the furnace 12, that is, no slag is tapped off from the furnace 1. The furnace 12 may be of any suitable construction, and is shown as an ordinary open hearth reducing furnace. In it the mass which is practically a silicate, is heated in conjunction with suitable agents to fuse the silica and reduce the metal. These agents preferably are introduced in the form of borax or other acid forming sodium or potassium compounds, and bauxite or kaolin in some form, such as feldspar or other material containing aluminum. There is also added a small quantity of carbon containing substance, preferably a substance in which the carbon is in a practically pure state, such as graphite, coal tar or the like. The heat may be supplied in any suitable way, such as common in open hearth furnaces. The bottom 14 of the furnace is basic, such as lime, and the graphite or other carbon bearing substance is thrown onto the same and the silicate introduced on top of the graphite, so that in the action of the furnace the boiling of the metal lifts the carbon, and greatly expands and lightens the mass. Preferably also the crown 15 and gas ports 16 are lined with carbonaceous matter, such as graphite brick, so that the gas is re-carbonized and as it licks the top of the boiling metal acts as a reducing agent. The result is that the basic silicate coming from the furnace 1 is neutralized by the acid forming agents, borax or sodium or potassium compounds, the silica is fluxed and quickly fused thereby, carrying with it the sulfur, phosphorous and other impurities, while the boiling of the mass frees the iron which settles to the bottom while the fused silica floats on top in a highly vitrified form, practically glass. The furnace is worked in the usual way and the several ingredients or fluxes are introduced in the necessary proportions, depending upon the quality of the product coming from the furnace 1. The neutralization of the basic silicate and the rapid fusing of the silica causes the iron to settle to the bottom in practically a pure state, while the slag, practically in the form of glass, floats on top, the elements separating by gravity. The charge will be drawn or tapped off in the usual way.

By the foregoing method the ore is not only very quickly reduced but also economically, and the impurities are all substantially carried away in the slag. This method is applicable to any grade of iron ore, even the very low grades containing a very large excess of silica and which have heretofore not been economical to reduce. Cinder from Bessemer converters, open hearth furnaces and slags which are largely silicates can be reduced in the second furnace by the method described.

What I claim is:

1. The process of reducing iron ore containing silica, consisting in transforming the same by means of heat into a silicate of iron, and then separating said silicate into iron and vitreous slag.

2. The process of reducing iron ore containing silica, consisting in transforming the same by means of heat into a silicate of iron, conveying the product to a second furnace and there further heating the same and separating the silicate into iron and vitreous slag.

3. The process of reducing iron ore containing silica, consisting in transforming the same by means of heat into a silicate of iron, and then treating the same in the presence of heat with fluxes for the silica and a small portion of graphite.

4. The process of reducing iron ore containing silica, consisting in fusing the same to form a silicate of iron, such fusing being carried on under suction, and then treating said silicate with glass fluxes and reducing agents to separate the same into iron and vitreous slag.

5. The process of reducing iron ore containing silica, consisting in heating the same in one furnace and under suction and reducing the same to a silicate of iron, conveying the product to a second furnace and there treating the same with glass fluxes and graphitic carbon and separating the silicate into iron and vitreous slag.

6. The process of separating silicate of iron, consisting in heating the same in a furnace having a basic bottom covered with graphite, and with fluxes for silica.

7. The process of separating silicate of iron, consisting in treating the same in a basic furnace with heating gases containing carbon and with fluxes for silica, and re-carbonizing the heating gases.

In testimony whereof, I, the said GEORGE L. FOGLER, have hereunto set my hand.

GEORGE LUTHER FOGLER.

Witnesses:
F. W. WINTER,
ROBERT C. TOTTEN.